United States Patent
Akasaka et al.

(10) Patent No.: US 6,910,901 B2
(45) Date of Patent: Jun. 28, 2005

(54) CARD CONNECTOR ASSEMBLY (75) Inventors: Junya Akasaka, Kanagawa (JP); Hiroyuki Suwa, Yamanashi (JP)

(73) Assignees: Tyco Electronics AMP K.K., Kanagawa (JP); Fanuc Ltd., Yamanashi (JP)

( * ) Notice: Subject to any disclaimer, the term of this patent is extended or adjusted under 35 U.S.C. 154(b) by 0 days.

(21) Appl. No.: 10/623,091

(22) Filed: Jul. 17, 2003

(65) Prior Publication Data

US 2004/0018761 A1 Jan. 29, 2004

(30) Foreign Application Priority Data

Jul. 18, 2002 (JP) ........................................ 2002-209231

(51) Int. Cl.⁷ .............................................. H01R 13/62
(52) U.S. Cl. ...................................................... 439/159
(58) Field of Search ................................. 439/159, 160, 439/327, 326, 328, 157, 152, 325; 361/680, 685, 726; 235/441

(56) References Cited

U.S. PATENT DOCUMENTS

| | | | | |
|---|---|---|---|---|
| 5,443,394 A | * | 8/1995 | Billman et al. | ............. 439/157 |
| 5,511,985 A | * | 4/1996 | Noschese et al. | ............ 439/157 |
| 5,526,226 A | * | 6/1996 | Katoh et al. | ................ 361/680 |
| 6,039,587 A | | 3/2000 | Oguchi | |
| 6,394,828 B1 | * | 5/2002 | Kodama et al. | ............ 439/159 |

FOREIGN PATENT DOCUMENTS

| | | |
|---|---|---|
| JP | 8-7980 | 1/1996 |
| JP | 2000-223211 | 8/2000 |

* cited by examiner

Primary Examiner—Alexander Gilman
(74) Attorney, Agent, or Firm—Barley Snyder LLC (57) ABSTRACT

A card connector assembly is capable of preventing extraction of cards of varying dimensions and shapes. The card connector assembly is constructed of a connector and a box for housing the connector. A first plate that moves horizontally by operation of a slider, first and second cam protrusions that cam engage the first plate, and a second plate positioned above the first plate are provided in the box. When the slider is moved rightward, the first plate engages the second cam protrusions and rises, to press the second plate upward. An elastic rubber piece is adhesively attached to the second plate. The elastic rubber piece frictionally contacts a lower main surface of a card to prevent extraction thereof.

5 Claims, 6 Drawing Sheets

CARD CONNECTOR ASSEMBLY

FIELD OF THE INVENTION

The present invention relates to a card connector assembly, and more particularly to a card connector assembly having a card extraction prevention mechanism.

BACKGROUND

Card connector assemblies mechanically hold and electrically connect PC cards to a computer or the like. They are utilized for memory cards (PC cards) such as PCMCIA cards, and are provided in personal computers and the like. Extraction prevention means may be provided to prevent accidental extraction of a card during use after the card is inserted into a connector. One exemplary card connector assembly utilizes engagement hooks that snap in place to engage the end portion on the extraction side of an inserted card. Another exemplary card card assembly includes an arcuate spring that protrudes within a card receiving slot and presses against the main surface of a card received therein, to prevent the card from flying out and dropping during ejection thereof.

These extraction prevention means, however, can not effectively accommodate the use of different PC cards, which is often desireable. With regard to the card connector having engagement hooks, for example, it may be desireable to alternatively install cards having different dimensions, such as a PCMCIA card and a Compact Flash™ card (which is smaller than a PCMCIA card), mounted in an adaptor, into the same card connector receiving slot. Because the lengths of these cards differ in the insertion direction, a connector having an engagement hook as its extraction prevention means cannot be used for these different types of cards. With regard to the card connector assembly using an arcuate spring cards of varying thickness can not be effectively interchanged in a single receiving slot. If a card is inserted into the card receiving slot that is thicker than the optimum card thickness, then the resistance during insertion will be unacceptably high. If a card is inserted that is thinner than the optimum card thickness, then the holding strength will be unacceptably low.

SUMMARY OF THE INVENTION

The present invention provides a card connector assembly which is capable of positively preventing extraction of cards, even if they are of different dimensions and shapes.

The card connector assembly of the present invention has a card receiving slot and an extraction prevention mechanism for preventing extraction of a card inserted in the card receiving slot. The extraction prevention mechanism features a frictional retention member provided within the card receiving slot, held so as to be movable in a direction essentially perpendicular to the main surface of the card inserted therein. A cam mechanism urges the frictional retention member toward the main surface of the card, and an operating member drives the cam mechanism, wherein extraction of the card is prevented by operating the operating member to press the frictional retention member against the main surface of the card.

DETAILED DESCRIPTION

Figure 1:
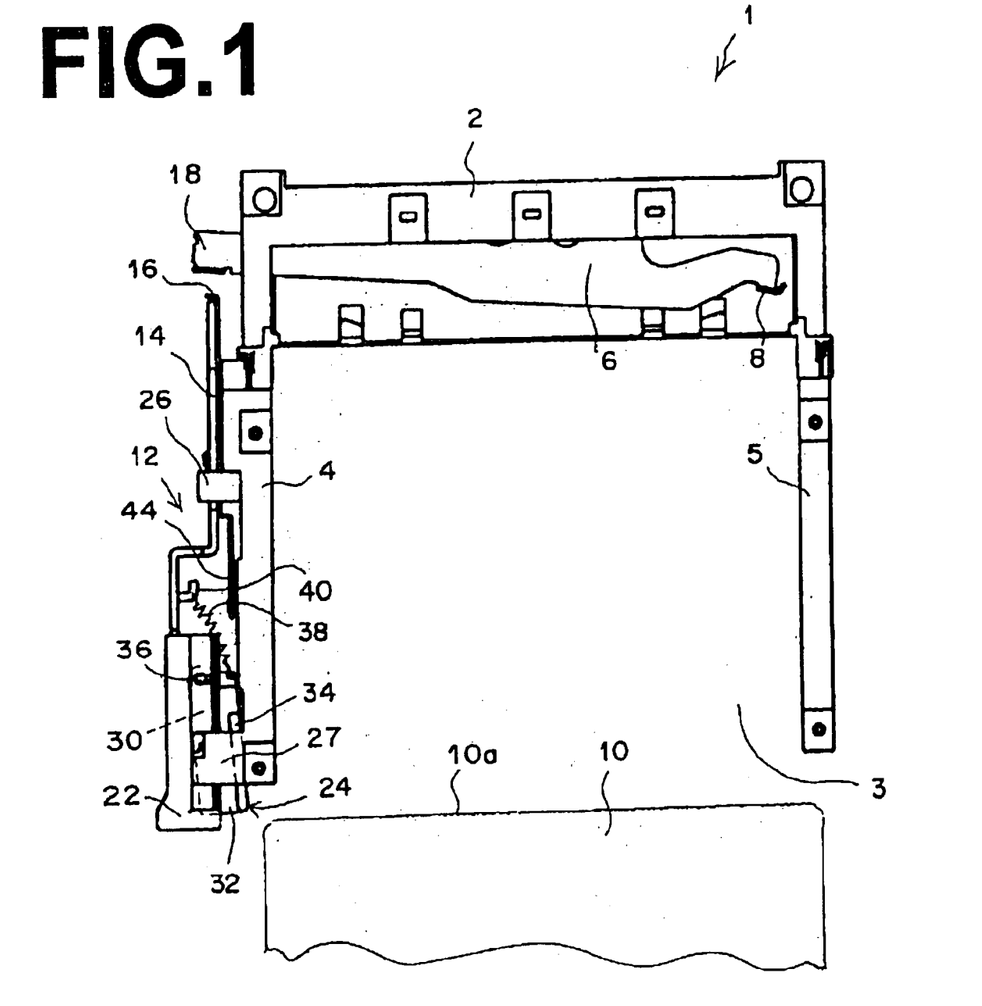
FIG. 1 is a plan view of an exemplary card connector with retention means according to an embodiment of the present invention.

Following is a description of an exemplary embodiment of the card connector assembly (hereinafter, simply referred to as "assembly") of the present invention with reference to the attached drawings. FIG. 1 is a plan view of a card connector (hereinafter, simply referred to as "connector") which is utilized in the assembly of the present invention, and FIG. 2 is a perspective view of the connector of FIG. 1.

Figure 2:
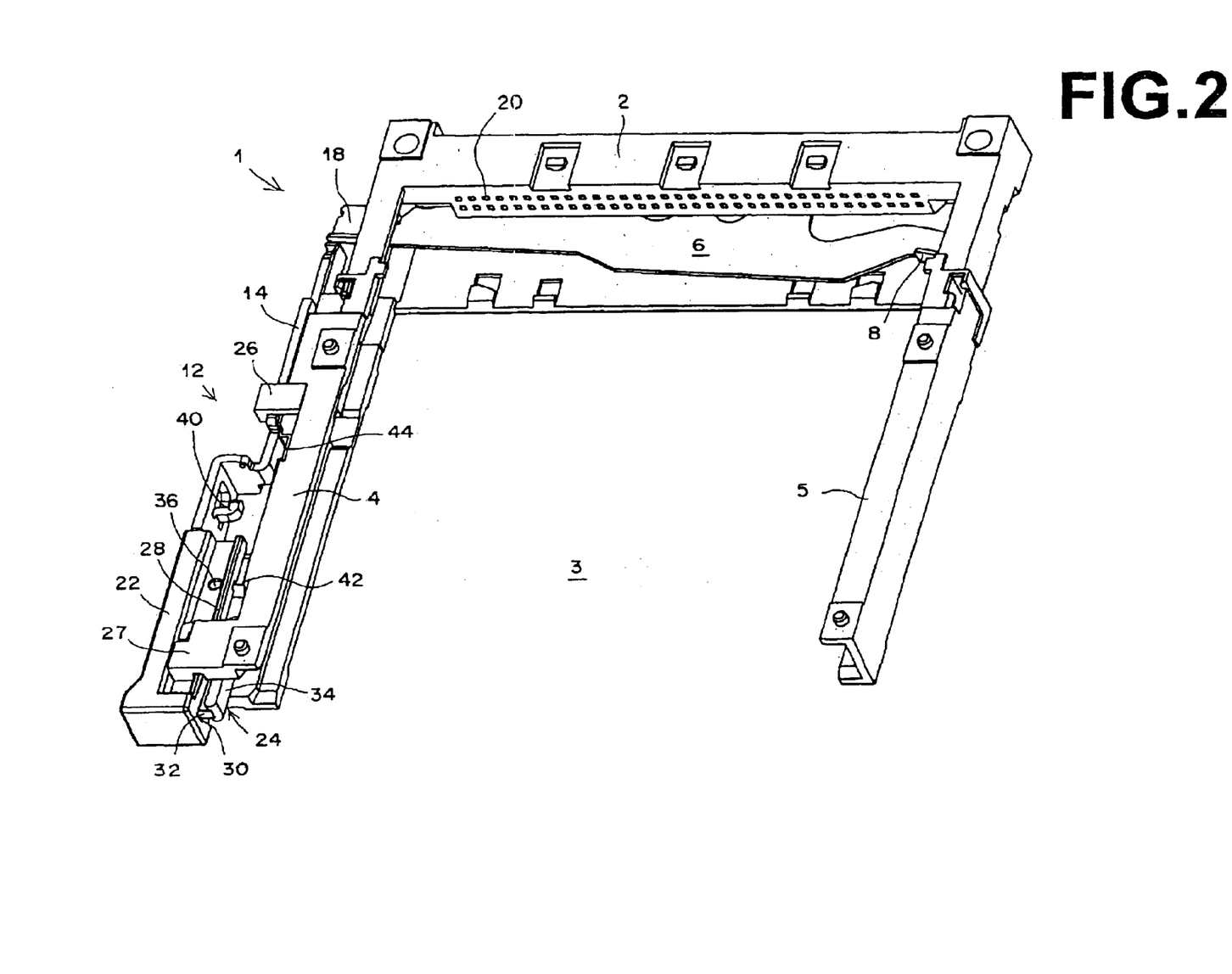
FIG. 2 is a perspective view of the card connector of FIG. 1.

As shown in FIGS. 1 and 2, a connector 1 comprises a main body 2, in which a plurality of contacts (not shown) are arranged, and card guides 4 and 5. Card guides 4 and 5 are C-shaped in cross section and are mounted on both ends of the main body 2.

A plurality of contact housing apertures 20 (FIG. 2), into which contacts of a card 10 are inserted, are arranged in the main body 2. A card receiving slot 3 for receiving the card 10 is defined by the pair of card guides 4 and 5.

The main body 2 is provided with a cam bar 6 for ejecting the card 10, that swings within a plane parallel to the drawing sheet of FIG. 1. An end surface 8 is formed at one end of cam bar 6, and is configured to abut a front end 10a of the card 10 (FIG. 1) to eject the card 10. The other end 18 of the cam bar 6 protrudes from the main body 2 and abuts the front end 16 of an ejector bar 14 of in ejecting mechanism 12, to be described later. The ejector bar 14 is configured to cause the cam bar 6 to swing. Note that here, "front" refers to the direction toward the top of the connector 1 in FIG. 1, and that "rear" refers to the direction toward the bottom of the connector 1 in FIG. 1. For convenience, "left" and "right" will apply to the directions to the left and to the right in each figure.

Ejection mechanism 12 is a push/push type ejecting mechanism (hereinafter, simply referred to as "ejecting mechanism"), which is mounted on the card guide 4. 15 The ejecting mechanism 12 comprises: an ejector bar 14 that extends in the insertion/ejection direction of the card 10 and may be formed by punching and bending a metal plate; a knob 22 mounted on the rear end of the ejector bar 14; a stopper member 24 rotatably mounted on the knob 22; and a tongue piece 44 mounted at the approximate midpoint of the ejector bar 14.

The ejecting mechanism 12 alternately maintains the knob 22 in a protruded position (second position—not shown) and a depressed position (first position—as shown in FIGS. 1 and 2), by simply depressing the knob 22 repetitively. This is achieved by the engagement relationship between a heart shaped cam groove 11 (FIG. 4) which is formed on the outer side surface of the card guide 4, and a cam follower (not shown) mounted on the tongue piece 44. That is, each time that the knob 22 is depressed, the cam follower of the tongue piece 44 stops at either of a predetermined depressed position and a predetermined protruded position within the heart shaped cam groove 11, to perform positioning of the knob 22. The heart shaped cam groove 11 is of a structure known in the art, and therefore, a detailed description thereof will be omitted.

The ejector bar 14 has an L-shaped bend at its approximate midpoint, and the distal end thereof is gripped by a pair of brackets 26 that protrude from the card guide 4 so as to be slidable in the insertion/ejection direction of the card 10. The knob 22 has a rib 28 that extends in the insertion/ejection direction of the card 10, integrally formed therewith. The rib 28 is slidably held by a pair of brackets 27, which are formed integrally with the card guide 4. In addition, a slot 30 that extends in the insertion/ejection direction of the card 10 is formed in the surface of the knob 22 that faces the card guide 4.

The stopper member 24 may be a resin member of a substantially rectangular shape when viewed from above. The stopper member 24 comprises a plate portion 32 that enters the slot 30; and a reinforcement portion 34 formed integrally with the plate portion 32 on a side edge thereof so that the two portions perpendicularly intersect. The stopper member 24 is rotatably supported on the knob 22 by a pin 36. A coil spring 38 (omitted from FIG. 2) is hooked on an inwardly facing protrusion 40 provided on the ejector bar 14 and a front end portion of the stopper member 24 toward the card guide 4. Thereby, the stopper member 24 is constantly urged in the counterclockwise direction about the pin 36. However, when the knob 22 is in the depressed state, as shown in FIGS. 1 and 2, the stopper member 24 is pressed into the slot 30 by the card guide 4. The ejector bar 14 is constantly urged to protrude from the connector 1 by a coil spring 13 (FIG. 4) hooked on the ejector bar 14 and the card guide 4.

A cutout 42 is formed in the vicinity of the rear edge of the card guide 4. The cutout 42 extends from the rear edge of the card guide 4, and is of a size capable of receiving the stopper member 24. When the stopper member 24 is housed within the knob 22 as shown in FIG. 1 and FIG. 2, that is, when the stopper member 24 and the knob 22 are aligned, nothing impedes the passage of the card 10 through the card receiving slot 3. Therefore, the card 10 is capable of being inserted smoothly into the card receiving slot 3. The knob 22 shown in FIG. 1 and FIG. 2 is in a position in which it is pressed into the connector 1 (i.e., depressed). In this state, the card 10 has been ejected from the connector 1. Therefore, another card 10 may be inserted into the card receiving slot 3.

As described previously, when knob 22 is pressed it goes from the recessed position to the protruded position and vice versa. When knob 22 goes to the protruded position, stopper member 24 rotates about pin 36 to a position protruding into the card receiving slot 3. The stopper member 24 protrudes into the card receiving slot to prevent the card 10 from being inserted therein when the knob 22 is in the protruded position, such as when the knob is erroneously pressed while it is in the depressed position prior to insertion of a card. This structure is provided to prevent inadvertent ejection of the card 10 during use, such as in the case that a user feels the protruded knob 22 is in the way and presses it during use. When the card 10 is to be ejected after use, the knob 22, which is in the position shown in FIG. 1 (and FIG. 2) is pressed to cause it to protrude. It should be noted that the stopper member 24 cannot rotate into the card receiving slot 3 due to the presence of the card. Then, the knob 22 in the protruded state is pressed to eject the card 10.

Figure 3:
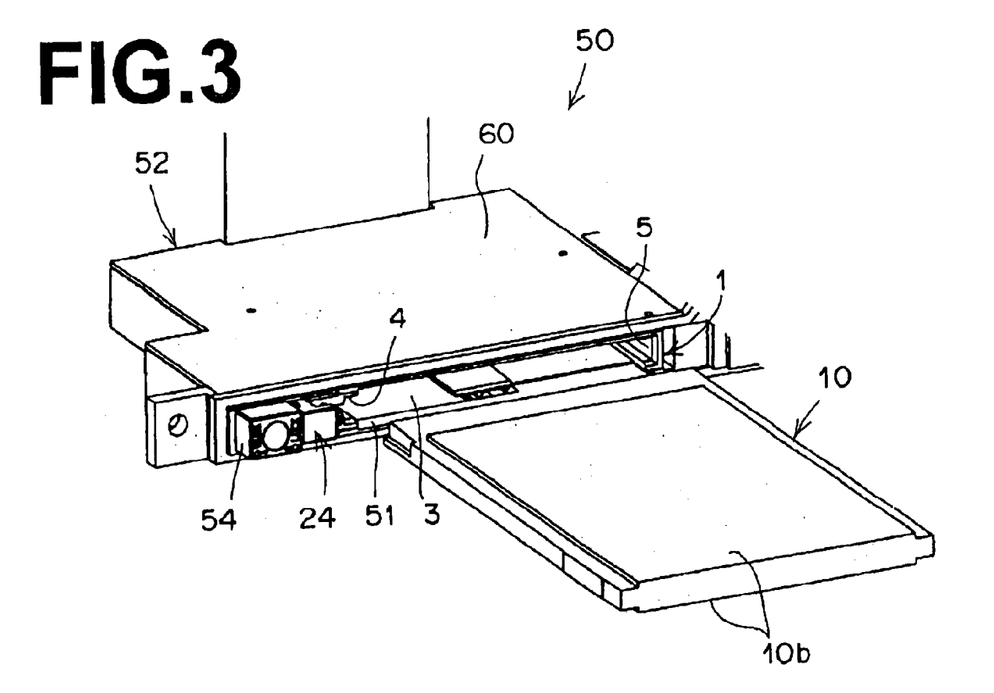
FIG. 3 is a perspective view that shows an exemplary card connector assembly according to an embodiment of the present invention and a card.

FIGS. 3–9 show, an exemplary assembly 50 according to the present invention that utilizes the connector 1. FIG. 3 is a perspective view that shows the assembly 50 and the card 10. The assembly 50 comprises a box 52 that surrounds the outer periphery of the connector 1. An opening 51 is formed in the box 52 at the insertion side of the card 10. The opening 51, with the card guides 4 and 5, construct the card receiving slot 3. A slider 54 (operating member) is provided in the vicinity of the knob 22 of the connector 1. The slider 54 will be described hereafter.

Figure 4:
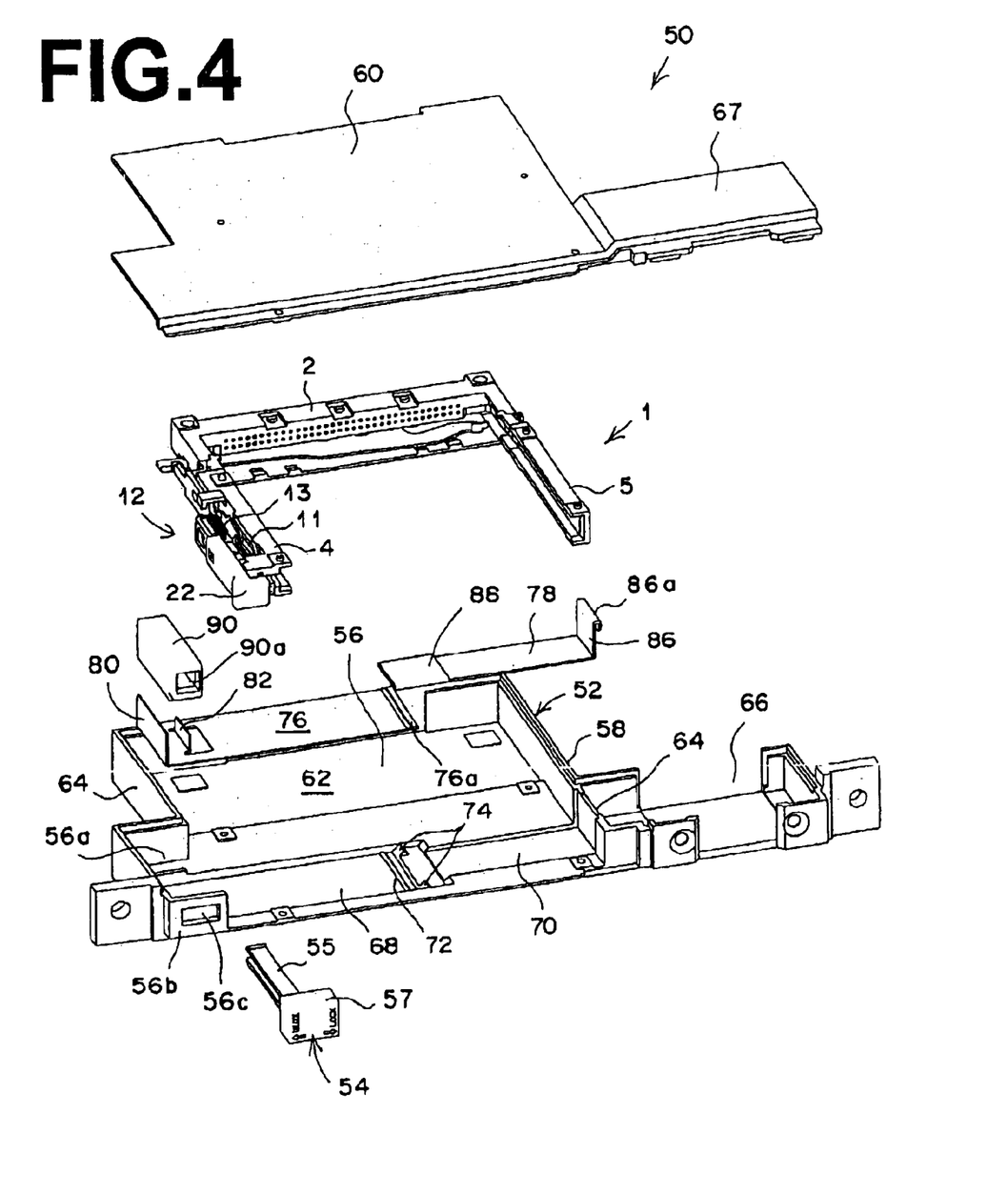
FIG. 4 is an exploded perspective view of the card connector assembly shown in FIG. 3.

FIG. 4 is an exploded perspective view of the assembly 50 shown in FIG. 3. The box 52 comprises a main body 58 having a housing portion 56 for housing the connector 1 therein; and a cover 60 for covering the upper portion of the main body 58. The main body 58 comprises a bottom wall 62 and walls 64 that are erected from the outer peripheral portions of the bottom wall 62. The walls 64 are erected to match the outer dimensions of the connector 1, and an outwardly extended portion 56a is provided at the portion that corresponds to the ejecting mechanism.

A receiving portion 66 for another type of connector, such as a USB (Universal Serial Bus) connector, may be provided on the wall 64 opposite from the extended portion 56a. A small cover portion 67 is formed also on the cover 60 corresponding to the receiving portion 66. Wide grooves 68 and 70 that extend in the direction perpendicular to the insertion/ejection direction of the card 10 across the entire rear end portion of the main body 58 are formed in the vicinity of the rear end portion of the main body 58. The wide groove 68 is slightly deeper and longer than the wide groove 70. Cam protrusions 72 and 74 are formed integrally with the bottom wall 62 in the vicinity of the end of the wide groove 68 close to the wide groove 70, that is, the right end in FIG. 4. The cam protrusions 74 are formed as a pair of protrusions which are separated along the insertion/ejection direction. Each of the cam protrusions 74 are formed to be of a greater height than the cam protrusion 72, and are erected more toward the wide groove 70 than the cam protrusion 72.

A plate 76 which is rectangular when viewed from above and slidable in the horizontal direction within the wide groove 68 is provided in the wide groove 68. At this time, a plate 78 is positioned between the pair of cam protrusions 74. Two holding walls 80 and 82 are erected at the end of the plate 76 on the side of the extended portion 56a. The holding wall 80 may be formed by bending the end of the plate 76, and the holding wall 82 may be formed by cutting out and bending the plate 76, at a position remote from the holding wall 80. In addition, the end of the plate 76 toward the wide groove 70 may be bent inward to form a reinforced end 76a. An engagement groove 84 (FIG. 6, FIG. 8) which is capable of engagement with the cam protrusions 72 and 74 is provided on the bottom surface of the plate 76 in the vicinity of the reinforced end 76a. The engagement relationship between the groove 84 and the cam protrusions 72 and 74 will be described later.

A mounting piece 86 for mounting the plate 78 on the wall 64 may be formed by bending at the outer end of the plate 78. A holding piece 86a that extends over the wall 64 to the other side thereof to sandwich the wall 64 between it and the mounting piece 86 is provided at the end of the mounting piece 86. In addition, an elastic rubber piece 88 (frictional retention member) is attached to the end of the plate 78 toward the wide groove 68, such as with adhesive. When the plates 76 and 78 are arranged in the wide grooves 68 and 80, the reinforced end 76a of the plate 76 is positioned under the end of the plate 78 with the elastic rubber piece 88.

A resin box member 90 with a hole 90a is placed between the holding walls 80 and 82. The box member 90 is positioned at the extended portion 56a. In addition, a rear wall 56b is provided at the rear end of the box 52 at the extended portion 56a. A horizontally extending rectangular opening 56c is formed in the rear wall 56b. Slider 54 comprises a block shaped handle 57, a pair of legs 55 extending from the handle 57 and box member 90. The handle 57 and the box member 90 are arranged so that they sandwich the rear wall 56b therebetween. That is, the legs 55 of the handle 57 are inserted through the rectangular opening 56c into the hole 90a of the box member 90. The legs 55 engage the hole 90a, and the handle 57 and the box member 90 become integrated as the slider 54. The legs 55 are smaller than the rectangular opening 56c, therefor allowing horizontal movement of the slider 54. When the slider 54 is moved, the plate 76, which is engaged with the box member 90, is also moved.

Figure 5:
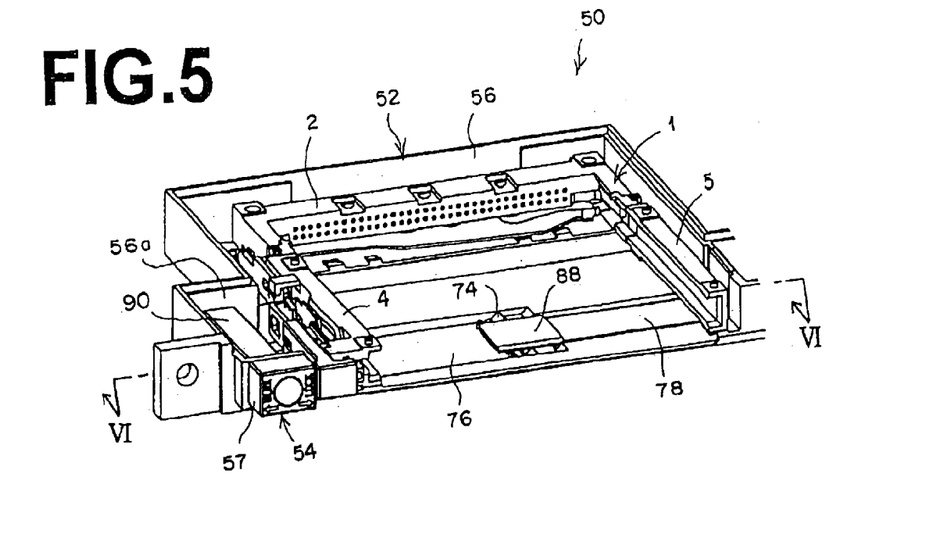
FIG. 5 is a perspective view of the card connector assembly of FIG. 3, with its cover removed for clarity, showing the card connector disposed within a housing portion, and a slider disposed in an extended portion in an unlocked position.
Figure 6:
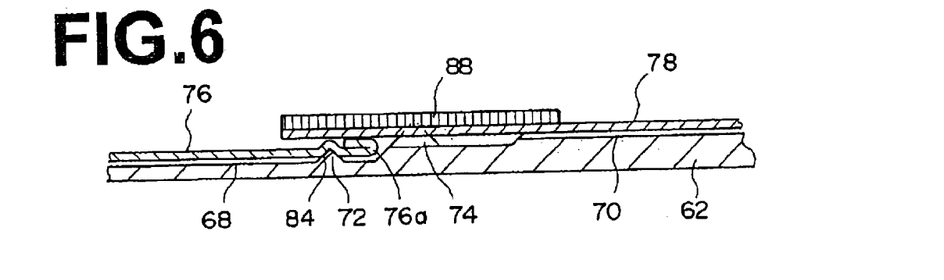
FIG. 6 is a partial sectional view taken along the line VI—VI of FIG. 5 that shows engagement between a plate and a cam protrusion of a cam mechanism.

Next, the operation of the slider 54 will be described with reference to FIGS. 5–9. FIG. 5 is a perspective view, with the cover removed for clarity, showing the the connector 1 disposed within the housing portion 56 of the box 52, and the slider 54 disposed in the extended portion 56a. In FIGS. 5 and 6, the handle 57 of the slider 54 is positioned at its leftmost or "unlock" position within its range of motion in the horizontal direction. The engagement state between the plate 76 and the cam protrusion 72 will be described with reference to FIG. 6. Note that the slider 54, the plates 76 and 78, and the cam protrusions 72 and 74 are collectively referred to as a cam mechanism.

FIG. 6 is a partial sectional view taken along the line VI–VI of FIG. 5 that shows the engagement state between the plate 76 and the cam protrusion 72 when the slider 54 is at its leftmost or "unlock" position. In the "unlock" position, the engagement groove 84 of the plate 76 engages with the cam protrusion 72 so that it does not move in the horizontal direction. In this state, the end of the plate 78 having the elastic rubber piece 88 thereon is atop the reinforced end 76a of the plate 76, and the plate 78 is not displaced in the vertical direction. Accordingly, when the card 10 is inserted into the card receiving slot 3 with the slider in the "unlock" position, the card 10 passes above the elastic rubber piece 88 without contact therebetween.

Figure 7:
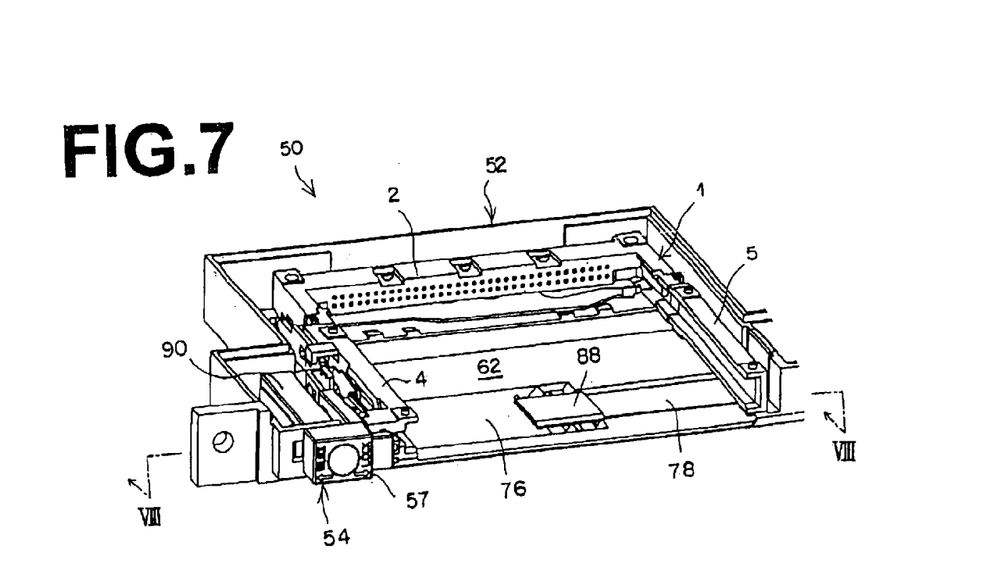
FIG. 7 is a perspective view of the connector assembly of FIG. 3 showing the cam mechanism with a handle of the slider moved to the right in a locked position.
Figure 8:
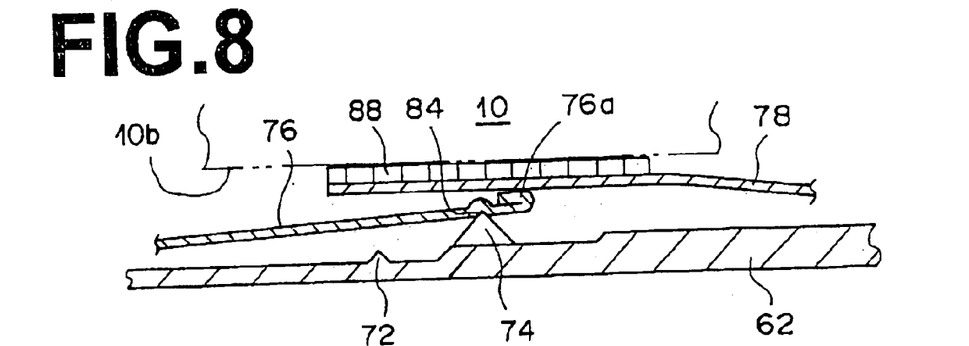
FIG. 8 is a partial sectional view of the cam mechanism that shows an elastic rubber piece pressed against the card to prevent extraction thereof.

If the slider 54 is operated so that it is moved rightward, then the slider 54 assumes a "lock" position shown in FIGS. 7 and 8. FIG. 7 is a perspective view of assembly 50, with the cover 60 omitted for clarity, showing the state of the cam mechanism when the handle 57 of the slider 54 is moved to the right or the "lock" posirtion. In the "lock" position, as shown in FIG. 8, the elastic rubber piece 88 is frictionally engaged (pressed into contact) with the card 10 to prevent extraction thereof. When the slider 54 is moved to the right, the engagement groove 84 and the cam protrusion 72 are disengaged, and the plate 76 moves to the right. At the rightmost or "lock" position, the engagement groove 84 engages with the cam protrusions 74. The cam protrusions 74 are of a greater height than the cam protrusion 72, that is, they protrude more toward the card 10. Therefore, the reinforced end 76a of the plate 76 presses the plate 78 upward from below. The plate 78 is lifted up by elastically rotating about its fixed end, that is, the mounting piece 86 (shown in FIG. 4), and the elastic rubber piece 88 on the plate 78 is pressed into contact (frictionally engages) against a lower main surface 10b of the card 10. The card 10 is prevented from being extracted from the card receiving slot 3 by this frictional contact. The elastic rubber piece 88 is capable of positively maintaining the card 10 in an engaged state regardless of variance in the vertical position of the lower main surface 10b of the card 10, due to its elasticity. In other words, even if the thickness of the card 10 varies due to the type of card, extraction of the card 10 can be positively prevented. Further, the extraction prevention effect is improved due to an increase in the frictional coefficient.

Figure 9:
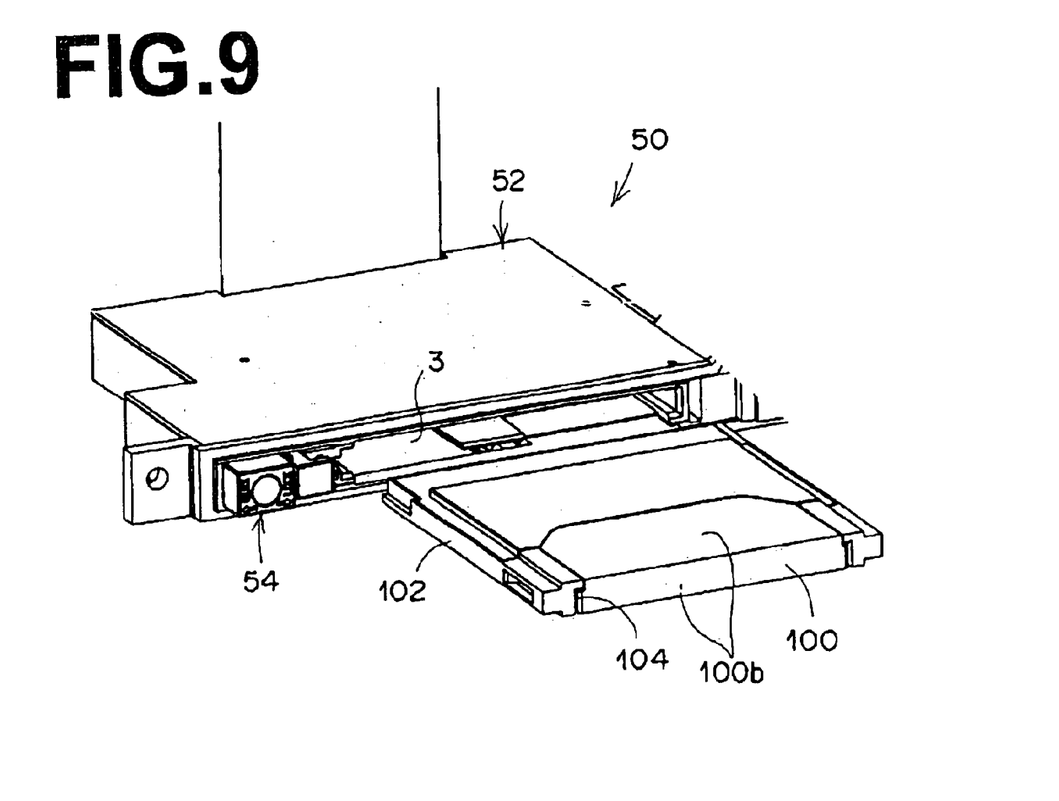
FIG. 9 is a perspective view showing a miniature card, used with an adapter, with the card connector assembly of FIG. 3.

As shown in FIG. 9, an assembly 50 according to the present invention is effective with a card of a different format. FIG. 9 is a perspective view showing a card 100 which is smaller than the card 10 (shown ig FIGS. 3–8). Card 100 is disposed in an adapter 102, for use with the assembly 50. Here, the adapter 102 is provided with an opening 104 for receiving the card 100. The adapter 102 is of the same width as the card 10. By inserting the card 100 into the adapter 102, then inserting the adapter into the card receiving slot 3, the card 100 may be used in the same manner as the card 10. The card 100 is shorter, in the insertion/ejection direction than the card 10, which would render engagement hooks inoperative. Because a main surface of the card 100 is pressed into contact with the elastic rubber piece 88, however, the same extraction prevention effect is obtained as would be provided for the card 10.

In an exemplary embodiment of the present invention, the frictional retention member 88 is formed from rubber. Because the frictional retention member 88 is formed of rubber, the range of thicknesses of cards that can be held is increased. At the same time, the frictional coefficient between the frictional retention member 88 and the card is increased, thereby improving the extraction prevention effect.

Extraction of the card is prevented by operating the operating member to positively displace the frictional retention member 88 to press against the main surface of the card. Therefore, the card connector assembly of the present invention frictionally engages the card and hold it regardless of the length or the thickness of the card. In addition, when the card is inserted, the frictional retention member is not moved toward the card, and does not interfere with insertion of the card. Therefore, the frictional retention member does not contribute to resistance during insertion, and the card may be inserted smoothly.

A preferred embodiment of the present invention has been described above. However, the present invention is not limited to the embodiment described herein. It goes without saying that various modifications and changes are possible. For example, the plate 78 is mounted to the box 52 with a cantilever structure in the embodiment described above. However, the plate 78 may be provided with a plurality of legs, which penetrate the bottom wall 62 of the box 52 so as to render the plate 78 movable in the vertical direction.

What is claimed is:

1. A card connector assembly, comprising:

a card receiving slot;

an extraction prevention mechanism for preventing extraction of a card inserted in the card receiving slot; the extraction prevention mechanism having a frictional retention member provided within the card receiving slot, held so as to be movable in a direction essentially perpendicular to the main surface of the card inserted therein; a cam mechanism for urging the frictional retention member toward the main surface of the card; and an operating member for driving the cam mechanism; wherein extraction of the card is prevented by operating the operating member to press the frictional retention member against the main surface of the card;

a main body; and a cam protrusion provided on a bottom wall of the main body;

wherein the cam mechanism has:

a first plate on which the frictional retention member is mounted, provided above the bottom wall; and a second plate provided underneath the first plate, slidably movable by the operating member to a position corresponding to the cam protrusion; wherein the first plate having the frictional retention member mounted thereon is caused to be urged toward the card by the second plate riding up on the cam protrusion by operation of the operating member.

2. A card connector assembly as defined in claim 1, wherein:

the frictional retention member is formed from rubber.

3. A card connector assembly as defined in claim 1, wherein:

the operating member comprises a slider operably connected to the cam mechanism.

4. A card connector assembly as defined in claim 1, wherein:

the operating member comprises a slider operably connected to the first plate.

5. A card connector assembly as defined in claim 1, further comprising:

at least two cam protrusions provided on a bottom wall of the main body, a first one of the cam protrusions being configured to retain the cam mechanism without urging the frictional retention member into contact with the main surface of the card, and a second one of the cam protrusions being configured to urge the frictional retention member into contact with the main surface of the card.

* * * * *